United States Patent Office 3,749,642
Patented July 31, 1973

3,749,642
METHOD FOR THE PRODUCTION OF AMINOPENICILLINS
Takeshi Takahashi and Toshiyuki Takahashi, Osaka, and Masao Isono, Hyogo, Japan, assignors to Takeda Chemical Industries, Ltd., Osaka, Japan
No Drawing. Filed Dec. 27, 1971, Ser. No. 212,655
Claims priority, application Japan, Dec. 25, 1970, 45/129,650
Int. Cl. C12d 9/00
U.S. Cl. 195—29                    22 Claims

ABSTRACT OF THE DISCLOSURE

A method for producing aminopenicillins of the formula

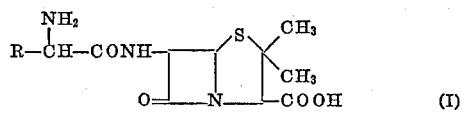

wherein R stands for a six-membered cyclic hydrocarbon residue optionally having one or more substituents on its ring, which comprises subjecting (1) an α-substituted-α-amino acid derivative of the formula

wherein R has the aforementioned significance and A is a member selected from the group consisting of alkoxy, carboxyalkylthio, amino and carboxyalkylamino and (2) 6-aminopenicillanic acid to an enzymatic action of a microorganism which is capable of producing an aminopenicillin of the Formula I from an α-substituted-α-amino acid derivative of the Formula II and 6-aminopenicillanic acid but substantially incapable of producing penicillin G from phenylacetic acid and 6-aminopenicillanic acid, the microorganism belonging to a genus Mycoplana, Protaminobacter, Acetobacter, Aeromonas or Xanthomonas.

---

The present invention relates to a novel and industrially advantageous method for the production of aminopenicillins.

More particularly, the present invention relates to a method for producing an aminopenicillin of the formula

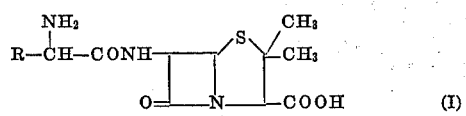

wherein R stands for a six-membered cyclic hydrocarbon residue which may have a substituent or substituents on its ring from (1) and α-substituted-α-amino acid derivative of the formula

wherein R has the aforementioned significance and A stands for alkoxy, carboxyalkylthio, amino or carboxyalkylamino and (2) 6-aminopenicillanic acid through the utilization of a microorganism having a novel type of substrate specificity.

Hitherto, the production of aminopenicillins by the condensation reaction between α-substituted-α-amino acids and 6-aminopenicillanic acid has been carried out by means of chemical reactions. However, it is required in these known methods either to protect amino group of the amino acids to prevent it from the reaction with carboxyl group or to previously convert the amino group into a radical such as azido group ($N_3$) which may be reconverted into amino group. Thus, it is necessary after the condensation reaction either to remove the protective group from the amino group or to reconvert said radical into amino group, and these side-step procedures must be conducted under moderate conditions so as not to give any influence on the moieties than that concerned with these reactions, especially so as not to split the penicillin moiety or the acid amide bond in the side chain at its 6-position. These moderate conditions inevitably decrease the yield of the objective aminopenicillins.

Meanwhile, the microbial production of the aminopenicillins is considered more advantageous than chemical production because it is unnecessary to protect the amino group of α-amino acid and therefore because the objective aminopenicillins may be produced by a single step. However, all of the hitherto-tried microbial achievements are limited to those methods in which use is made of microorganisms having a strong ability of producing penicillin G, which has no amino group at the α-position of the N-acyl group, from phenylacetic acid and 6-aminopenicillanic acid. These known microorganisms show specifically strong activity to produce penicillin G and they show relatively low activity to produce aminopenicillins. For instance, the production of α-aminobenzylpenicillin from 6-aminopenicillanic acid and phenylglycine methyl ester with employment of such a known microorganism is very disadvantageous as compared with the production of penicillin G from 6-aminopenicillanic acid and phenylacetic acid methyl ester under the same conditions.

Therefore, the known microbial methods are not necessarily satisfactory from the viewpoint of industrial production of aminopenicillins.

The present inventors have unexpectedly found that there exist at a high frequency among the microorganisms of the genera Mycoplana, Protaminobacter, Acetobacter, Aeromonas and Xanthomonas those microorganisms having a novel type of substrate specificity, i.e. being capable of producing aminopenicillins from α-substituted-α-amino acid derivatives and 6-aminopenicillanic acid but substantially incapable of producing penicillin G from phenylacetic acid and 6-aminopenicillanic acid under the same conditions, and that when these microorganisms are employed aminopenicillins can be smoothly produced in a high yield from α-substituted-α-amino acid derivatives and 6-aminopenicillanic acid.

Thus, the principal object of the present invention is to provide a novel and industrially advantageous method for producing α-aminopenicillins (I) from α-substituted-α-amino acid derivatives and 6-aminopenicillanic acid.

Further objects of the present invention will become apparent as the following specification proceeds.

Referring to the above-described Formula I, R is a six-membered cyclic hydrocarbon residue, i.e. phenyl, cyclohexenyl (i.e. 1-cyclohexenyl, 2-cyclohexenyl or 3-cyclohexenyl), cyclohexadienyl (i.e. 1,3-cyclohexadienyl, 1,4-cyclohexadienyl, 1,5 - cyclohexadienyl or 2,5 - cyclohexadienyl) or cyclohexyl, each of which may have a substituent or substituents on its ring. The substituents may be exemplified by hydroxy; halogens (e.g. bromine and chlorine); alkyls (e.g. methyl, ethyl, isopropyl, allyl and octyl); alkoxyls (e.g. methoxy, ethoxy, isopropoxy, allyloxy and hexoxy); carboxyl; mercapto; cyano; nitro; sulfo, amino, sulfamino and the like.

Referring to the Formula II, R is one of the above-mentioned cyclic hydrocarbon residues and A is an alkoxy (e.g. methoxy, ethoxy, propoxy, isopropoxy, allyloxy and hexyloxy); a carboxyalkylthio (e.g., carboxymethylthio and carboxyethylthio); amino group or a carboxyalkyl-amino (e.g. carboxymethylamino). In other words, the α-substituted-α-amino acid derivatives (II) are alkyl esters of the α-substituted-α-amino acids of the formula

wherein R is as defined above, thioesters of the same, amides of the same or dipeptides between the same and other amino acids. The α-substituted-α-amino acids of the Formula II′ are phenylglycine, cyclohexenylglycine, cyclohexadienylglycine and cyclohexylglycine which may have one or more of the substituents mentioned above on their rings. As the examples of the α-substituted-α-amino acids (II′) having the cyclic hydrocarbon residues substituted with such a substituent, there may be enumerated monohydroxyphenylglycine such as p-hydroxyphenylglycine; monohalogenophenylglycine such as o-chlorophenylglycine; monoaminophenylglycine such as m-aminophenylglycine; mononitrophenylglycine such as p-nitrophenylglycine; monocarboxylphenylglycine such as p-carboxylphenylglycine; monosulfophenylglycine such as m-sulfophenylglycine; monomethoxyphenylglycine such as p-methoxyphenylglycine; monoalkylphenylglycine such as p-methylphenylglycine; monocyanophenylglycine such as m-cyanophenylglycine; monosulfaminophenylglycine such as p-sulfaminophenylglycine and the like. Monosubstituted cyclohexadienylglycines, monosubstituted cyclohexenylglycines and monosubstituted cyclohexylglycines are also employed similarly to the above-mentioned monosubstituted phenylglycines. Furthermore, phenylglycine, cyclohexadienylglycine, cyclohexenylglycine and cyclohexylglycine which have two or more substituents of the same or different kinds are also employable. As the substituents in this case, optional combinations of various substituents mentioned above may be chosen. Though there are some new compounds among these α-substituted-α-amino acids (II′), they can be easily prepared by, for example, Strecker's reaction from aldehydes having the corresponding R group.

There are optical isomers regarding the respective α-substituted-α-amino acid derivatives (II) and it is recommended from the antibacterial activities of the resulting aminopenicillins (I) to employ D-forms or DL-forms with regard to the α-carbon atom of these derivatives (I).

6-aminopenicillanic acid (III), another starting material, may be employed in the form of free acid or as its salt e.g. hydrochloride, sodium salt or potassium salt. The solutions containing a mixture of phenylacetic acid or phenoxyacetic acid and 6-aminopenicillanic acid obtainable by reacting known penicillin acylase with penicillin G or penicillin V are also employable similarly to pure 6-aminopenicillanic acid.

According to the method of the present invention, use is made of the microorganisms which belong to the genus Mycoplana, the genus Protaminobacter, the genus Acetobacter, or the genus Xanthomonas and which are capable of producing aminopenicillins (I) from the α-substituted-α-amino acid derivatives (II) and 6-aminopenicillanic acid but substantially incapable of producing penicillin G from phenylacetic acid and 6-aminopenicillanic acid. These microorganisms can be selected from the known cultures which are stored at microorganism depositories and also can be isolated from the nature. An illustrative procedure for isolating such a microorganism from the nature is given below.

First, microorganisms which are resistant to α-aminobenzylpenicillin, one of the aminopenicillins (I), and which can propagate by assimilating as the sole carbon source phenylglycine methyl ester, phenylglycine thioglycol ester or N-(phenylglycyl)glycine, all of which fall within the scope of the α-substituted-α-amino acid derivatives (II), are isolated from soil, sewage, sea water, fruits, the air and the like. Among thus-isolated strains the objective microorganisms which can smoothly accumulate an aminopenicillin from an α-substituted-α-amino acid derivative (II) (e.g., phenylglycine methyl ester) and 6-aminopenicillanic acid but cannot substantially accumulate penicillin G from phenylacetic acid and 6-aminopenicillanic acid under the same conditions can be found at a high frequency.

The following are typical examples of the microorganisms which have been isolated from the nature by the above-mentioned procedure and which are employable in the method of the present invention:

*Mycoplana dimorpha* IFO 13213 (ATCC 21759), *Protaminobacter alboflavus* IFO 13221 (ATCC 21755), *Acetobacter* sp. IFO 13209 (ATCC 21760), *Acetobacter* sp. IFO 13210 (ATCC 21761), *Acetobacter* sp. IFO 13211 (ATCC 21762), *Aeromonas* sp. IFO 13212 (ATCC 21763), and *Xanthomonas* sp. IFO 13215 (ATCC 21764). Throughout the present specification as well as in appended claims, the nomenclature of the genus Actobacter is employed according to the nomenclature described in "Bergey's Manual of Determinative Bacteriology," Seventh Edition (1957), and the IFO numbers indicate the accession numbers of the microorganisms deposited at Institute For Fermentation, Osaka, Japan. The ATCC numbers indicate the accession numbers of the microorganisms at American Type Culture Collection, Rockville, Maryland, U.S.A.

The microorganisms having said novel type of substrate specificity can be similarly selected from the known cultures collected in microorganism depositories. As the typical examples of the microorganisms thus-selected from the collected cultures, there may be enumerated *Acetobacter cerinus* IFO 3263, *Acetobacter dioxyacetonicus* IFO 3271, *Acetobacter posteurianum* IFO 3223, *Acetobacter suboxydans* IFO 3172, *Acetobacter turbidane* IFO 3225, *Acetobacter xylinum* IFO 3288, *Xanthomonas citri* IFO 3781 and *Xanthomonds oryzae* IFO 3995 and *Xanthomonas pruni* IFO 3780.

Thus, all the microorganisms employable in the method of the present invention are bacteria belonging to the family Pseudomonadacae.

In subjecting (1) an α-substituted-α-amino acid derivative (II) and (2) 6-aminopenicillanic acid to the enzymatic action of such a microorganism having said substrate specificity, it is possible to cultivate such a microorganism in a culture medium containing an α-substituted-α-amino acid derivative (II) and 6-aminopenicillanic acid, but it is generally recommended to previously cultivate such a microorganism in an ordinary culture medium and to employ the resulting culture broth or its processed material.

The cultivation of the microorganisms may be conducted under aeration with agitation, under shaking or under static conditions. Generally, the cultivation under aerobic conditions is advantageous.

As the culture medium, there may be employed those which contain one or more of the combinations of meat extract, yeast extract, peptone, casein hydrolysates, corn-steep liquor and other natural substances employed for general cultivation. These media may be optionally supplemented with carbon sources e.g. sugars, organic acids, normal paraffins; inorganic or organic nitrogen-containing compounds containing nitrogen in amino form and/nitrate form; phosphates; manganese salts, sodium chloride, other ionic metals and/or vitamins. The media are preferably adjusted to pH 6 to 8. The preferable cultivation temperatures are from 20° to 40° C., especially from 28° to 37° C. Though the cultivation period varies with the cultivation apparatus, the medium composition, the cultivation temperature and the like, it is recommended to stop the cultivation at the time when amino-pencillin-synthesizing activity reaches the maximum, from the late stage of the logarithmic growth phase to the early stage of the stationary phase. Generally, the cultivation for 16 to 40 hours gives the good results.

Thus-obtained culture broths or their processed materials are employable for the enzymatic synthesis of aminopenicillins (I) in the method of the present invention. The term "processed materials of culture broths" as used throughout this specification as well as claims means all the materials prepared by subjecting the culture broths to a suitable treatment or treatments to increase the aminopenicillin-synthesizing activity and to make into an advantageous form for the enzymatic reaction. For example, in case that the said activity exists in the bacterial cells, the processed materials are exemplified by (1) cell suspensions preparable by suspending the cells, which are recovered from the culture broths and then washed, into buffer solutions of various concentrations, (2) cell extracts obtainable by applying known extraction techniques to the cells, (3) purified enzyme preparation having the aminopenicillin-synthesizing activity preparable from the cell extracts by known methods, and the like. In case that the said activity exists outside the bacterial cells, the processed materials are exemplified by (1) culture liquids obtainable by removing cells from the culture broths, (2) purified enzyme preparation having the aminopenicillin-synthesizing activity preparable by subjecting the culture liquids to known purification techniques for general enzymes, and the like.

The condensation reaction between (1) an $\alpha$-substituted-$\alpha$-amino acid derivative (II) and (2) 6-aminopenicillanic acid to give a corresponding aminopenicillin (I) smoothly proceeds by contacting both the compounds with the above-mentioned culture broth or its processed material in an aqueous medium. The term "an aqueous medium" as used throughout the present specification as well as appended claims means a medium comprising mainly water. Thus, the aqueous medium may contain a water-miscible organic solvent such as lower alcohol (e.g. methanol, ethanol or isopropanol), acetone or the like. The preferred concentration of such an organic solvent is less than about 40% by volume, more preferably less than about 20% by volume, relative to the whole volume of the ultimate medium. It is generally recommended to adjust the aqueous medium to a pH from about 4 to about 8, most advantageously to a pH from about 5 to about 7. Though the reaction period varies with the substrate concentration, the level of the aminopenicillin-synthesizing activity of the culture broth or processed material employed, the reaction temperature and the like, it generally lies in a range from about 0.5 to 5 hours. The reaction temperature may be advantageously chosen in a range from about 10° to about 50° C., most advantageously from about 20° to about 40° C. The substrate concentration may be chosen mainly depending upon the level of the aminopenicillin-synthesizing activity. Generally, the concentration of 6-aminopenicillanic acid relative to the whole aqueous medium is chosen from a range from about 0.1 to about 5% (weight/volume), while that of the $\alpha$-substituted-$\alpha$-amino acid derivative (II) is chosen from a range from about 0.1 to about 10% (weight/volume). Advantageously, the $\alpha$-substituted-$\alpha$-amino acid derivative (II) is employed in a concentration of at least equimole, advantageously of not less than 2 time-moles, relative to 6-aminopenicillanic acid used.

Thus-produced aminopenicillin (I) may be easily recovered from the reaction mixture and purified under moderate conditions by per se known techniques such as chromatography.

The method of the present invention is especially characterized by the following advantages:

(1) It is possible to produce the aminopenicillins (I) in a high yield from the $\alpha$-substituted-$\alpha$-amino acid derivatives (II) and 6-aminopenicillanic acid without splitting $\beta$-lactam ring of the penicillins.

(2) It is possible to directly employ the solutions containing a mixture of phenylacetic acid and 6-aminopenicillanic acid obtainable by treating penicillin G of low cost with known penicillin acylase, instead of employment of expensive 6-aminopenicillanic acid, because penicillin G is not substantially produced even when phenylacetic acid coexists in the reaction system for aminopenicillin production.

(3) The cultivation of the microorganisms to be employed is very easy.

(4) The aminopenicillins produced can be easily recovered from the reaction mixtures.

Thus, the method of the present invention is a very advantageous method for the production of the aminopenicillins (I) on an industrial scale.

The microorganisms of the genus Pseudomonas show similar properties to those of the microorganisms employed in the present invention. But, as far as the strains of Pseudomonas investigated by the present inventors are concerned, they tend to have a relatively strong $\beta$-lactamase activity.

The following examples are intended merely to illustrate presently preferred embodiments of the present invention and not to restrict the scope of the present invention.

Reference 1 illustrates a typical selection procedure for the microorganisms employable in the present invention; Reference 2 shows characteristics of Aeromonas sp. IFO 13212 isolated from river water, one of the microorganisms selected in Reference 1; and Reference 3 illustrates the typical procedures for preparing 1-cyclohexenylglycine methyl ester, a novel compound employed as one of the $\alpha$-substituted-$\alpha$-amino acid derivatives (II) in examples.

Throughout the foregoing description as well as in the following examples, references and claims "$\mu$g.," "mg.," "ml.," "° C.," "M" and "N" respectively refer to "microgram(s)," "milligram(s)," "milliliter(s)," "degrees centigrade," "molar concentration" and "normality," and percents are weight per volume unless otherwise specified. In examples and references, the relationship between parts by weight and parts by volume corresponds to that between grams and milliliters.

REFERENCE 1

Selection of the microorganisms employable in the present invention

The microorganisms which can propagate on both Medium A(*1) and Medium B(*2) described below were isolated from soil, sewage, sea water, river water, fruits and the air. Among thus-isolated microorganisms, those microorganisms which can smoothly accumulate $\alpha$-aminobenzylpenicillin from phenylglycine methyl ester and 6-aminopenicillanic acid but cannot accumulate an appreciable amount of penicillin G from phenylacetic acid and 6-aminopenicillanic acid under the same conditions were selected by the following procedure.

Each of the isolated microorganisms was cultivated in Medium E(*5) for 2 days. 3 ml. of the resulting broth was inoculated into 300 ml. of Medium C(*3) or D(*4) in an Erlenmeyer flask and cultivated with shaking at 28° C. for 40 hours. The cells were recovered by centrifugation from each of the resulting broths, washed with a 0.1 M-citrate-phosphate buffer solution of pH 5.5 and then suspended into 60 ml. of the said buffer solution containing 5 mg./ml. of 6-aminopenicillanic acid and 20 mg./ml. of D-phenylglycine methyl ester or phenylacetic acid. The respective suspensions were incubated with shaking at 37° C. for 1 hour. The analysis of the produced compounds was conducted in the conventional technique for penicillins, i.e. the bioassay as well as bioautography employing Staphylococcus aureus 209P as the test microorganism, as is described in "Antibiotics & Chemotherapy," 3, 50–54 (1953).

The examples of the microorganisms thus-selected are listed below in Table 1.

TABLE 1

| Microorganisms | Amount of accumulated compound, mg./ml. | |
| --- | --- | --- |
| | α-Aminobenzylpenicillin | Penicillin G |
| Mycoplana dimorpha IFO 13213 | 5.2 | ND |
| Acetobacter sp. IFO 13211 | 4.6 | ND |
| Acetobacter sp. IFO 13209 | 4.8 | ND |
| Acetobacter sp. IFO 13210 | 4.5 | ND |
| Aeromonas sp. IFO 13212 | 4.6 | ND |
| Xanthomonas sp. IFO 13215 | 4.2 | ND |
| Protaminobacter alboflavus IFO 13211 | 4.5 | ND |

NOTE.—"ND" means that the product could not be appreciated and therefore that the amounts of the product were less than about 0.1 mg./ml.

(*1): Medium A

Bacto-nutrient broth, dehydated (commercially available, distributed by Difco Laboratories, U.S.A.) ----percent-- 0.8
Eurocidin ----μg./ml-- 10
α-Aminobenzylpenicillin ----μg./ml-- 1
Agar ----percent-- 2

(*2): Medium B

D-phenylglycine methyl ester (or D-phenylglycylglycine) ----percent-- 0.1
Yeast extract ----do---- 0.01
$MgSO_4 \cdot 7H_2O$ ----do---- 0.01
$NH_4NO_3$ ----do---- 0.004
$K_2HPO_4$ ----do---- 0.01
Urea ----do---- 0.002
Eurocidin ----μg./ml-- 10
Agar ----percent-- 2

(*3): Medium C

| | Percent |
| --- | --- |
| Meat extract | 1.0 |
| Yeast extract | 0.5 |
| Peptone | 1.0 |
| NaCl | 0.5 |
| D-phenylglycine methyl ester | 0.05 | pH 7.2.

(*4): Medium D

| | Percent |
| --- | --- |
| Meat extract | 1.0 |
| Yeast extract | 0.5 |
| Peptone | 1.0 |
| NaCl | 0.5 |
| Phenylacetic acid | 0.05 | pH 7.2.

(*5): Medium E

| | Percent |
| --- | --- |
| Meat extract | 1.0 |
| Yeast extract | 0.5 |
| Peptone | 1.0 |
| NaCl | 0.5 | pH 7.2.

REFERENCE 2

Characteristics of Aeromonas sp. IFO 13212

Shore rods, 0.6 x 1–2 micrometers. Motile by means of polar flagella. Gram-negative.
Agar colonies: Circular, dull yellow, umbonate, semitransparent.
Agar slant: Filiform, dull yellow, smooth.
Broth: Turbid, with pellicle.
Litmus milk: Acid, coagulated.
Potato: Yellowish brown.
Indoles produced.
Nitrites produced from nitrates.
Hydrogen sulfides produced.
Catalase: Positive.
Acid and gas from many carbohydrates.
Starch hydrolyzed.
Cells don't fix free atmospheric nitrogen.

REFERENCE 3

(A) Preparation of DL-1-cyclohexenylglycine

A solution of 4.4 parts by weight of 1-cyclohexene-1-aldehyde in 8 parts by volume of methanol is added to a solution of 2 parts by weight of sodium cyanide and 2.36 parts by weight of ammonium chloride in 8 parts by volume of water and the mixture is stirred at room temperature for 2 hours, at the end of which time 20 parts by volume of water is added. The resulting aminonitrile compound is extracted with 20 parts by volume of benzene. The benzene layer is extracted three times with 10 parts by volume portions of 6 N-hydrochloric acid, respectively, and the aqueous layer is refluxed for 2 hours. The resinous matter is removed with activated carbon and the filtrate is concentrated to about 15 parts by volume and brought to about pH 5.0 with concentrated aqueous ammonia (28%), whereupon crude crystals of DL-1-cyclohexenylglycine is separated out. The crystals are recovered by filtration and dissolved in 1 N-aqueous solution of sodium hydroxide. To the solution is added activated carbon and the mixture is subjected to filtration. To the filtrate, ethanol (one-half volume of the filtrate) is added, and the mixture is boiled, followed by adjusting its pH about 5.0 with hydrochloric acid, whereby 1.1 part by weight of DL-1-cyclohexenylglycine as colorless flakes melting at 242°–243° C. is obtained.

IR(KBr, cm.$^{-1}$): 3160, 2960, 1605, 1490, 1400, 1345, 1274, 1145, 720.

NMR (solvent: 1 N NaOD):

1.5–2.4 (multiplet, 8H)

3.81 (singlet, 1H, —C$\underline{H}$—COOH)

5.84 (multiplet, 1H, —C$\underline{H}$=C—)

(B) Preparation of DL-1-cyclohexenylglycine methyl ester 10 parts by weight of DL-1-cyclohexenylglycine is suspended into 100 parts by volume of methanol. While the resulting suspension is cooled at about −15° C., 80 parts by weight of thionyl chloride is dropwise added thereto. After the addition of thionyl chloride, the mixture is kept standing at 4° C. for 3 days. The mixture is concentrated under reduced pressure and the resulting residue is crystallized from 20 parts by volume of a mixture of methanol and diethyl ether (1:1 by volume) to give about 10 parts by weight of DL-1-cyclohexenylglycine methyl ester.

NMR (n $D_2O$), δ (p.p.m.): 1.8$^B$ (4 protons on the C–4 and C–5 carbons of the ring), 2.05$^B$ (4 protons on the C–2 and C–6 carbons of the ring), 3.92$^S$ (3 protons of the methyl group), 4.64$^S$ (1 proton on the α-carbon), 6.21$^B$ (1 proton on the olefinic carbon of the ring).

Notes: S, singlet; B, broad.

(C) Preparation of D-1-cyclohexenylglycine methyl ester

To a solution of 10 parts by weight of DL-1-cyclohexenylglycine methyl ester hydrochloride in 1,000 parts by volume of water adjusted to pH 7.2 with the addition of 2 N-sodium hydroxide is added 1 part by weight of a commercially available chymotrypsin ("α-Chymotrypsin" sold by Sigma Chemical Company, Missouri, U.S.A., it shows 50 units/mg. of chymotrypsin activity). The mixture is incubated at 23° C. for 2 hours with adjusting its pH to 7.2 by the addition of 1 N-sodium hydroxide.

After adjusted to pH 8.0 with the addition of 5 N-sodium hydroxide, the reaction mixture is subjected to extraction 5 times with 1,300 parts each by volume of diethyl ether. The resulting diethyl ether layer is evaporated to dryness at 25° C. under reduced pressure to give brown oily residue. To the residue is added 100 parts by volume of HCl-saturated methanol and the mixture is concentrated under reduced pressure. To the resulting residue is dropwise added 30 parts by volume of diethyl ether and the mixture is concentrated to give 3.5 parts by weight of D-1-cyclohexenylglycine methyl ester. Its specific rotation is $[\alpha]_D^{25}=-115°$ (C=0.5, 0.1 N—HCl). Its NMR spectrum is identical with that of DL-1-cyclohexenylglycine methyl ester.

EXAMPLE 1

The condensation reactions between DL-1-cyclohexenylglycine methyl ester and 6-aminopenicillanic acid, between DL-cyclohexylglycine methyl ester and 6-aminopenicillanic acid and between D-phenylglycine methyl ester and 6-aminopenicillanic acid were conducted with employment of the microorganisms having been selected in Reference 1. The reactions were conducted under the same conditions as in Reference 1 except for that Medium E was employed for the cultivation of the microorganisms in place of Medium C or D.

The amounts of accumulated aminopenicillins are shown in Table 2 below:

TABLE 2

| Microorganisms | α-Amino-benzyl-penicillin (mg./ml.) | 6-(α-amino-1'-cyclo-hexenyl-acetamido) penicillanic acid (mg./ml.) | 6-(-α amino-cyclohexyl-acetamido) penicillanic acid (mg./ml.) |
|---|---|---|---|
| *Mycoplana dimorpha* IFO 13213 | 4.4 | 2.8 | 0.6 |
| Acetobacter sp. IFO 13211 | 3.5 | 0.5 | 0.4 |
| Acetobacter sp. IFO 13209 | 4.5 | 3.4 | 3.2 |
| Acetobacter sp. IFO 13210 | 4.7 | 0.5 | 1.8 |
| Aeromonas sp. IFO 13212 | 4.2 | 0.8 | 0.5 |
| Xanthomonas sp. IFO 13215 | 3.5 | 1.5 | 1.8 |

EXAMPLE 2

The culture broths of *Acetobacter cerinus* IFO 3263, *Acetobacter dioxyacetonicus* IFO 3271, *Acetobacter pasteurianum* IFO 3223, *Acetobacter suboxydans* IFO 3172, *Acetobacter turbidans* IFO 3225, *Acetobacter xylinum* IFO 3288, and *Xanthomonas citri* IFO 3781 obtained by slant cultivation for 2 days were inoculated into 3 parts by volume of Medium E and cultivated at 28° C., with shaking for 2 days, respectively. Each of the resulting broths were inoculated into 300 parts by volume of Medium C and cultivated with shaking at 28° C. for 40 hours, respectively. The cells were collected from the respective broths by centrifugation, washed with a 0.1 M-citrate-phosphate buffer solution of pH 5.5, suspended into 60 parts by volume of the said buffer solution containing 5 mg./ml. of 6-aminopenicillanic acid and 20 mg./ml. of D-phenylglycine methyl ester, and incubated with shaking at 37° C. for 1 hour.

The amounts of accumulated α-aminobenzylpenicillin are shown in Table 3 below:

TABLE 3

| Microorganisms: | α-Aminobenzylpenicillin (mg./ml.) |
|---|---|
| *Acetobacter cerinus* IFO 3260 | 3.5 |
| *Acetobacter dioxyacetonicus* IFO 3271 | 4.2 |
| *Acetobacter pasteurianum* IFO 3223 | 3.2 |
| *Acetobacter suboxydans* IFO 3172 | 3.8 |
| *Acetobacter turbidans* IFO 3225 | 2.5 |
| *Acetobactor xylinum* IFO 3288 | 3.6 |
| *Xanthomonas citri* IFO 3781 | 3.8 |

EXAMPLE 3

3 parts by volume of the 2-day culture of *Escherichia coli* IFO 3210 (ATCC 21758) was inoculated into 300 parts by volume of Medium D and cultivated with shaking at 37° C. for 48 hours. To the resulting culture broth was added 3.3 parts by weight of potassium penicillin G dissolved in a 0.1 M-phosphate buffer solution of pH 6.0 and reacted for 16 hours, whereby penicillin G was completely decomposed into 6-aminopenicillanic acid and phenylacetic acid.

After the separation of the microorganism cells, to the reaction mixture were added 8 parts by weight of D-phenylglycine methyl ester and 6 parts by weight of washed cells of Mycoplana sp. IFO 13213 having been obtained by the cultivation in Medium C after the manner described in Example 1. The mixture was incubated with shaking at 37° C. for 1 hour, whereby 4.5 mg./ml. of α-aminobenzylpenicillin was accumulated therein.

EXAMPLE 4

30 parts by volume of the 4 day-culture of *Fusarium solani* IFO 8509 was inoculated into 1,000 parts by volume of a culture medium containing 3% of sucrose, 0.2% of sodium nitrate, 0.1% of dipotassium hydrogenphosphate, 0.05% of potassium chloride, 0.05% of magnesium sulfate, 0.001% of ferrous sulfate and 0.05% of phenoxyacetic acid (pH 6), and was cultivated with shaking at 28° C. for 4 days. To the resulting culture broth was added 10 parts by weight of potassium penicillin V dissolved in 100 parts by volume of a 0.25 M-phosphate buffer solution of pH 7 and the mixture was incubated with shaking at 28° C. for 16 hours. The microorganism cells were removed from the mixture by filtration to give a solution containing 5.3 mg./ml. of 6-aminopenicillanic acid (measured by the Ninhydrin reaction) and about equimolar phenoxyacetic acid.

Separately, Acetobacher sp. IFO 13209 was inoculated into 5,000 parts by volume of Medium E and cultivated at 37° C. for 20 hours. The cells were recovered by centrifugation and washed with 1,000 parts by volume of a 0.9% saline.

To the above-mentioned solution containing 6-aminopenicillanic acid were added 75 parts by weight of the above-obtained wet cells of Acetobacter sp. IFO 13209 and 20 parts by weight of D-phenylglycine methyl ester and the mixture was incubated with shaking at 37° C. for 1 hour, whereby 4.8 mg./ml. of α-aminobenzylpenicillin was accumulated therein.

EXAMPLE 5

0.5 part by volume of the 2 day-culture of *Protaminobacter alboflavus* IFO 13221 was inoculated into 30 parts by volume of a culture medium containing 1.0% of meat extract, 1.0% of peptone and 0.5% of sodium chloride (pH 7.2) and cultivated with shaking at 28° C. for 48 hours.

To the resulting culture broth were added D-phenylglycine methyl ester, DL-4-hydroxyphenylglycine methyl ester or DL-4-hydroxy-3,5-dichlorophenylglycine methyl ester dissolved in 15 parts by volume of a 0.25 M-citrate-phosphate buffer solution of pH 4.5 and 6-aminopenicillanic acid so as to make their final concentrations 1 mg./ml., respectively, and the respective mixtures were incubated with shaking at 37° C. for 1 hour, whereby 0.7 mg./ml. of α-aminobenzylpenicillin was produced from 6-aminopenicillanic acid and D-phenylglycine methyl ester; 0.3 mg./ml. of 6-[α-amino-α-(4-hydroxyphenyl)acetamido]penicillanic acid was produced from 6-aminopenicillanic acid and DL-4-hydroxyphenylglycine methyl ester; and 0.4 mg./ml. of 6-[α-amino-α-(3,5-dichloro-4-hydroxyphenyl)acetamido]penicillanic acid was produced from 6-aminopenicillanic acid and DL-4-hydroxy-3,5-dichlorophenylglycine methyl ester, respectively.

EXAMPLE 6

1 part by volume each of the 2-day culture of *Mycoplana dimorpha* IFO 13213, *Actobacter xylinum* IFO 3144 and *Acetobacter pasteurianum* IFO 3323 was inoculated into 30 parts by volume of a culture medium containing 1% of meat extract, 1% of peptone and 0.5% of sodium chloride (pH 7.2) and cultivated with shaking at 28° C. for 48 hours, respectively.

To each of the resulting culture broth were added DL-4-hydroxyphenylglycine methyl ester or DL-4-hydroxy-3,5-dichlorophenylglycine methyl ester dissolved in 15 parts by volume of a 0.25 M-citrate-phosphate buffer solution of pH 4.5 and 6-aminopenicillanic acid so as to make their final concentrations 1 mg./ml., respectively, and the respective mixtures were incubated at 37° C. for 1 hour, whereby the results summarized in Table 4 were obtained:

TABLE 4

| Microorganisms | Amount of accumulated 6-[α-amino-α-(4-hydroxyphenyl)-acetamido]-penicillanic acid (mg./ml.) | Amount of accumulated 6-[α-amino-α-(3,5-dichloro-4-hydroxyphenyl)-acetamido]-penicillanic acid (mg./ml.) |
|---|---|---|
| *Mycoplana dimorpha* IFO 13213 | 0.3 | 0.4 |
| *Acetobacter xylinum* IFO 3144 | 0.3 | 0.2 |
| *Acetobacter pasteurianum* IFO 3223 | 0.4 | 0.1 |

In this connection, it is to be noted that 6-[α-amino-α-(4-hydroxyphenyl)acetamido]penicillanic acid was produced from 6-aminopenicillanic acid and DL-4-hydroxyphenylglycine methyl ester, and 6 - [α-amino-α-(3,5-dichloro-4-hydroxyphenyl)acetamido]penicillanic acid was produced from 6-aminopenicillanic acid and DL-3,5-dichloro-4-hydroxyphenylglycine methyl ester, respectively.

EXAMPLE 7

To 30 parts by volume each of the 48 hour-cultures of Xanthomonas sp. IFO 13215 and *Xanthomonas citri* IFO 3781 obtained after the manner described in Example 5 were added D-phenylglycine methyl ester or DL-4-hydroxyphenylglycine methyl ester dissolved in 15 parts by volume of a 0.25 M-citrate-phosphate buffer solution of pH 4.5 and 6-aminopenicillanic acid so as to make their final concentrations 1 mg./ml., respectively, and the respective mixtures were incubated with shaking at 37° C. for 1 hour.

In case of the culture of Xanthomonas sp. IFO 13215, 0.5 mg./ml. of α-aminobenzylpenicillin was produced from D-phenylglycine methyl ester and 6-aminopenicillanic acid, and 0.2 mg./ml. of 6-[α-amino-α-(4-hydroxyphenyl)acetamido]-penicillanic acid was produced from DL - 4-hydroxyphenylglycine methyl ester and 6-aminopenicillanic acid, respectively.

In case of the culture of *Xanthomonas citri* IFO 3781, 0.4 mg./ml. of α-aminobenzylpenicillin and 0.6 mg./ml. of 6-[α-amino-α-(4-hydroxyphenyl)acetamido]penicillanic acid were produced from the corresponding precursors.

EXAMPLE 8

*Xanthomonas oryzae* IFO 3995 was inoculated into 5 parts by volume of a culture medium containing 2.0% of sucrose, 0.2% of monosodium glutamate, 0.2% of yeast extract, 0.5% of peptone, 0.2% of dipotassium hydrogenphosphate, 0.1% of magnesium chloride and 0.01% of ferrous sulfate (pH 7.2) (hereinafter this medium is referred to as "Medium F") and cultivated with shaking at 28° C. for 1 day. The resulting culture was inoculated into 100 parts by volume of Medium F and cultivated with shaking at 28° C. for 1 day.

The cells were collected by centrifugation from the culture broth and washed with 100 parts by volume of a 0.05 M-phosphate buffer solution of pH 6.0. The cells were suspended into 100 parts by volume of the said buffer solution having been supplemented with 2 parts by weight of D-phenylglycine methyl ester and 1 part by weight of 6-aminopenicillanic acid, and the mixture was incubated with agitation at 37° C. for 2 hours while adjusting its pH to 6.0 with the addition of 1N-sodium hydroxide, whereby 11.5 mg./ml. of α-aminobenzylpenicillin was produced.

The cells were removed by centrifugation from the reaction mixture and the resulting supernatant was allowed to pass through a column packed with 160 parts by volume of a commercially available polystyrene type adsorbent ("Amberlite XAD-2" sold by Rohm & Haas Co., U.S.A.). After washed first with 400 parts by volume of distilled water and subsequently with 500 parts by volume of a mixture of water and methanol (4:1 by volume), the column was subjected to elution with a mixture of water and methanol (1:1 by volume), whereby the objective compound was eluted. The eluate was concentrated under reduced pressure to give 0.83 part by weight of α-aminobenzylpenicillin as crystals. Its melting point is 200–202° C. (decomposition). Its infrared spectrum is identical with that of authentic α-aminobenzylpenicillin monohydrate.

EXAMPLE 9

30 parts by volume of the 24-hour culture Acetobacter sp. IFO 13209 was inoculated into 2,000 parts by volume of a culture medium containing 1% of glucose, 1% of meat extract, 1% of peptone and 0.5% of sodium chloride (pH 7.0) and cultivated under aeration with agitation at 28° C. for 24 hours.

The cells were recovered by centrifugation from the culture broth, suspended into 200 parts by volume of a 0.005 M-phosphate buffer solution of pH 6.0 and then associated with at 10 kilocycles per second for 20 minutes. The resulting sonicates were subjected to the action of deoxyribonuclease, treated with calcium phosphate gel to remove proteins and then treated with 60%-saturated ammonium sulfate solution to give precipitates. The precipitates were dissolved in a 0.01 M-phosphate buffer solution of pH 6.8, dialyzed overnight and then treated with diethylaminoethyl celulose to remove impure proteins. Thus-obtained solution was lyophilized to give 0.3 part by weight of crude powdery enzyme.

To a solution prepared by dissolving 0.08 part by weight of the crude powdery enzyme into 100 parts by volume of a 0.01 M-phosphate buffer solution, there were added 1.1 part by weight of potassium 6-aminopenicillanate and 3 parts by weight of D-phenylglycine methyl ester and the mixture was incubated at 37° C. for 1 hour, during which time the mixture was kept at pH 6.0 with the addition of 0.1 N-sodium hydroxide.

The reaction mixture was subjected to the same isolation procedure as described in Example 8 to give 0.42 part by weight of α-aminobenzylpenicillin as crystals.

EXAMPLE 10

*Xanthomas pruni* IFO 3780 was inoculated into 50 parts by volume of Medium F mentioned in Example 8 and cultivated with shaking at 28° C. for 24 hours. The resulting broth was inoculated into 500 parts by volume of Medium F and cultivated with shaking at 28° C. for 24 hours.

The cells were recovered by centrifugation from the culture both and washed with 100 parts by volume of a 0.05 M-phosphate buffer solution of pH 6.0. The cells were suspended into 200 parts by volume of said buffer solution having been supplemented with 2 parts by weight of D-1-cyclohexenylglycine methyl ester and 1 part by weight of 6-aminopenicillanic acid, and the mixture was incubated with agitation at 37° C. for 1 hour while adjusting its pH to 6.0 with the addition of 1 N-sodium hydroxide.

The reaction mixture was subjected to the same isolation procedure as described in Example 8 to give 0.42 part by weight of 6-(α-amino-1'-cyclohexenylacetamido) penicillanic acid as white crystals.

Melting point: 182–184° C. (decomposition)
Specific rotation: $[\alpha]_D^{25°\,C.} = 225°$ (C=0.5-N-HCl)
NMR (in $D_2O$) $\delta_{p.p.m.}$: 1.79S (2-$CH_3$), 1.92S (2-$CH_3$), 4.50S (3-H), 4.82S (hydrogen at α-carbon on the side chain), 5.80B (6-H+7-H), 6.22 (olefinic hydrogen on cyclohexene ring)

Antibacterial activities of this product against various microorganisms are shown in Table 5:

Table 5

Test microorganisms: Minimum inhibitory concentration (μg./ml.)

| | |
|---|---|
| Staphylococcus aureus 209P | 0.05 |
| Staphylococcus aureus No. 87 | 50 |
| Bacillus subtilis PCI 219 | 0.02 |
| Sartina lutea PCI 1001 | <0.01 |
| Escherichia coli NIHJ | 0.5 |
| Klebsiella pneumoniae Kbl | >100 |
| Proteus vulgaris Eb51 | 10 |
| Proteus morganii Eb53 | >100 |
| Proteus morganii Eb54 | 5 |
| Proteus mirabilis Eb59 | 5 |
| Pseudomonas aeruginosa Pd1 | 100 |
| Pseudomonas aeruginosa 10490 | 100 |

EXAMPLE 11

The microorganisms listed in Table 6 were inoculated into 50 parts by volume of Medium F mentioned in Example 8 or Medium G(*6), and cultivated with shaking at 28° C. for 18 hours, respectively.

The cells were recovered by centrifugation from each of the culture broths and suspended into 5 parts by volume of a 0.2 M-phosphate buffer solution of pH 6.0. To each of the solutions were added 0.1 part by weight of 6-aminopenicillanic acid and 5 parts by volume of a 0.1 M-$K_2HPO_4$ solution containing 0.3 part by weight of one of the D-phenylglycine derivatives listed in Table 6. The respective mixtures were incubated with shaking at 37° C. for 30 minutes, whereby α-aminobenzylpenicillin was accumulated in all of the mixtures.

The amounts (mg./ml.) of accumulated α-aminobenzylpenicillin are listed in Table 6.

ester and 20 parts by volume of one of the organic solvents listed in Table 7 and the respective mixtures were supplemented with above-mentioned buffer solution so as to make their final volumes 100 parts by volume. The resultant mixtures (designated as Reaction Systems 1, 2 and 3, respectively) were incubated with shaking at 28° C. for 30 minutes.

The amounts of accumulated α-aminobenzylpenicillin are shown in Table 7 below:

TABLE 7

| Reaction systems | | Amount of accumulated α-aminobenzylpenicillin (mg./ml.) |
|---|---|---|
| No. | Organic solvent employed | |
| 1 | Methanol | 8.5 |
| 2 | Ethanol | 8.8 |
| 3 | Acetone | 7.8 |

What is claimed is:
1. A method for producing an aminopenicillin of the formula

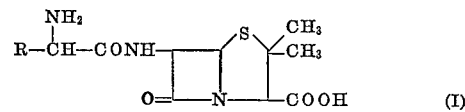

wherein R represents a six-membered cyclic hydrocarbon residue optionally having one or more substituents on its ring, which comprises subjecting (1) an α-substituted-α-amino acid derivative of the formula

wherein R has the aforementioned significance and A is a member selected from the group consisting of alkoxy, carboxyalkylthio, amino and carboxyalkylamino and (2) 6-aminopenicillanic acid to an enzymatic action of a microorganism which is capable of producing an aminopenicillin of the Formula I from an α-substituted-α-amino acid derivative of the Formula II and 6-aminopenicillanic acid but substantially incapable of producing penicillin G from phenylacetic acid and 6-aminopenicillanic acid, the microorganism belonging to a genus Mycoplana, Protaminobacter, Acetobacter, Aeromonas or Xanthomonas.

TABLE 6

| Microorganism | Medium employed for the cultivation of microorganism | D-phenylglycine derivative employed | | | | | | | |
|---|---|---|---|---|---|---|---|---|---|
| | | Methyl ester | Ethyl ester | n-Propyl ester | Iso-propyl ester | Tertiary-butyl ester | Thio-glycol ester | D-phenyl-glycine amide | D-N-(phen-ylglycyl)-glycine |
| Xanthomonas citri IFO 3781 | F | 5.0 | 5.0 | 5.0 | 3.2 | 1.9 | 2.9 | 3.8 | 5.0 |
| Xanthomonas oryzae IFO 3995 | F | 5.5 | 5.0 | 5.0 | 3.0 | 1.5 | 3.1 | 4.0 | 4.8 |
| Acetobacter sp. IFO 13209 | G | 5.5 | 4.2 | 4.2 | 3.5 | 1.9 | 2.5 | 3.2 | 5.2 |
| Acetobacter pasteurianum IFO 3223 | G | 5.1 | 4.9 | 5.0 | 2.3 | 1.5 | 2.8 | 3.5 | 4.5 |
| Acetobacter turbidans IFO 3225 | G | 5.5 | 5.0 | 5.2 | 2.5 | 1.7 | 3.1 | 3.8 | 4.8 |
| Acetobacter xylinum IFO 3288 | G | 3.0 | 2.0 | 2.5 | 1.5 | 1.3 | 2.0 | 1.5 | 3.5 |
| Mycoplana dimorpha IFO 13213 | G | 5.5 | 5.5 | 5.0 | 3.5 | 1.9 | 3.5 | 4.0 | 5.0 |
| Protaminobacter alboflavus IFO 13211 | G | 1.6 | 1.6 | 1.9 | 1.8 | 1.1 | 1.8 | 1.5 | 1.8 |

(*6): Medium G

| | Percent |
|---|---|
| Bacto-nutrient broth, dehydrated | 0.8 |
| Glucose | 1.0 |
| NaCl | 0.5 |
| pH 7.0. | |

EXAMPLE 12

Xanthomonas oryzae IFO 3998 was cultivated in Medium F mentioned in Example 8 in the same manner as described in Example 8.

The washed cells obtained from 1,500 parts by volume of the resultant culture broth were suspended into 150 parts by volume of a 0.1 M-phosphate buffer solution of pH 6.0. The suspension was divided into 3 portions. To each portion was added 1 part by weight of 6-aminopenicillanic acid, 2 parts by weight of D-phenylglycine methyl 2. A method according to claim 1, wherein the α-substituted-α-amino acid derivative and 6-aminopenicillanic acid are contacted with a culture broth of the microorganism, or the enzyme-containing processed material thereof in an aqueous medium.

3. A method according to claim 2, wherein the contact is conducted at a temperature from about 10 to about 50° C. and at a pH from about 4 to about 8.

4. A method according to claim 2, wherein the concentration of 6-aminopenicillanic acid relative to the aqueous medium is in a range of from about 0.1 to about 5% (weight/volume) and that of the α-substituted-α-amino acid derivative is in a range of from about 0.1 to about 10% (weight/volume).

5. A method according to claim 1, wherein the microorganism is *Mycoplana dimorpha*.

6. A method according to claim 1, wherein the microorganism is *Protaminobacter alboflavus*.

7. A method according to claim 1, wherein the microorganism is *Acetobacter cerinus*.

8. A method according to claim 1, wherein the microorganism is *Acetobacter dioxyacetonicus*.

9. A method according to claim 1, wherein the microorganism is *Acetobacter pasteurianum*.

10. A method according to claim 1, wherein the microorganism is *Acetobacter turbidans*.

11. A method according to claim 1, wherein the microorganism is *Acetobacter xylinum*.

12. A method according to claim 1, wherein the microorganism is *Xanthomonas citri*.

13. A method according to claim 1, wherein the microorganism is *Xanthomonas oryzae*.

14. A method according to claim 1, wherein the microorganism is *Xanthomonas pruni*.

15. A method according to claim 1, wherein A is alkoxy.

16. A method according to claim 1, wherein the substituent or substituents on ring R are hydroxy, halogen or both.

17. A method according to claim 1, wherein R is a phenyl.

18. A method according to claim 1, wherein R is phenyl having hydroxy, halogen or both on its ring.

19. A method according to claim 18, wherein R is 4-hydroxyphenyl.

20. A method according to claim 18, wherein R is 4-hydroxy-3,5-dichlorophenyl.

21. A method according to claim 1, wherein R is cyclohexenyl.

22. A method according to claim 1, wherein R is cyclohexyl.

References Cited
UNITED STATES PATENTS 3,682,777   8/1972   Nara et al. _____ 195—36 P ALVIN E. TANENHOLTZ, Primary Examiner U.S. Cl. X.R.

195—36 P